United States Patent [19]
Ichihashi et al.

[11] 3,964,076
[45] June 15, 1976

[54] SHUTTER SPEED DISPLAY DEVICES FOR ELECTRIC SHUTTER OPERATING CIRCUITS

[75] Inventors: Osamu Ichihashi, Machida; Sadao Muramatsu, Sagamihara, both of Japan

[73] Assignee: Yashica Co., Ltd., Tokyo, Japan

[22] Filed: July 11, 1974

[21] Appl. No.: 487,850

[30] Foreign Application Priority Data
July 27, 1973    Japan.......................... 48-89128[U]

[52] U.S. Cl. ............................... 354/51; 354/60 E; 354/60 L
[51] Int. Cl.²......................................... G03B 7/08
[58] Field of Search............. 250/214 R; 354/29, 30, 354/38, 43, 50, 51, 60 R, 60 E, 60 I

[56] References Cited
UNITED STATES PATENTS

| | | | |
|---|---|---|---|
| 3,603,799 | 9/1971 | Nobusawa...................... | 250/214 R |
| 3,648,580 | 3/1972 | Yanagi et al........................... | 354/51 |
| 3,678,826 | 7/1972 | Mori et al. ............................ | 354/51 |
| 3,712,192 | 1/1973 | Ono et al. .............................. | 354/51 |
| 3,798,662 | 3/1974 | Suzuki ................................... | 354/51 |
| 3,800,305 | 3/1974 | Ogiso et al. ....................... | 354/60 L |
| 3,812,503 | 5/1974 | Engelsmann et al.................. | 354/60 |
| 3,818,495 | 6/1974 | Sagara et al. .......................... | 354/53 |
| 3,877,039 | 4/1975 | Ichinohe et al....................... | 354/51 |

*Primary Examiner*—L. T. Hix
*Assistant Examiner*—James LaBarre
*Attorney, Agent, or Firm*—Charles W. Helzer

[57] ABSTRACT

In a shutter speed display device for use in combination with an electric shutter operating circuit of a photographic camera wherein an electric signal produced by a photosensitive element and corresponding to the brightness of an object is used to operate the shutter of the camera, there are provided an improved electric shutter operating circuit which comprises a first amplifier for amplifying the electric signal, a second amplifier comprising a field effect transistor connected to amplify the output from the first amplifier, a first impedance element connected between one terminal of the photosensitive element and the negative pole of a DC source, a second impedance element connected in parallel with the series circuit including the photosensitive element and the first impedance element, and a transistor connected to the output of the second amplifier for feeding back the output to the input of the first amplifier; and shutter speed display means determined primarily by the ratio of the value of the resistance of resistor 9 to resistor 10. The shutter speed display means preferably comprises comparator means connected to the source of the second, field effect transistor amplifier and to a reference voltage source so as to respond to a signal having the same phase as that of the input to the second, field effect transistor amplifier and the same magnitude as a selected reference voltage, and means responsive to the output from the comparator means for displaying a predetermined shutter speed.

10 Claims, 2 Drawing Figures

SHUTTER SPEED DISPLAY DEVICES FOR ELECTRIC SHUTTER OPERATING CIRCUITS

BACKGROUND OF THE INVENTION

This invention relates to a shutter speed display device for use in an electric shutter operating circuit of a photographic camera.

Recently, it has been proposed to use luminous diodes or liquid crystal elements for displaying the shutter speed of a photographic camera. In such shutter speed display devices, in order to detect the level of a signal utilized to display the shutter speed, it is necessary to increase the magnitude of the input signal from a sensor to a degree sufficient to nullify the effect of deviations of the characteristics of various elements utilized in the shutter speed display device from prescribed characteristics. To this end it is necessary to amplify the input signal. In order to construct an amplifier that will operate at a constant amplification factor even if the voltage of the supply source or ambient temperature varies. Therefore, it has been necessary to use a complicated circuit.

SUMMARY OF THE INVENTION

It is an object of this invention to provide an improved shutter speed display device having a simple circuit construction that can display a number of predetermined shutter speeds in response to an electric signal containing information regarding the brightness of the object to be photographed, the sensitivity of the film used and the degree of opening of the iris diaphragm.

Another object of this invention is to provide a novel shutter speed display device which does not require the use of an additional amplifier and does not affect the operation of the electric shutter operating circuit.

According to this invention, there is provided a shutter speed operating device for use in combination with an electric shutter operating circuit of a photographic camera wherein an electric signal produced by a photosensitive element and corresponding to the brightness of an object is used to operate the shutter of the camera, and the electric shutter operating circuit comprises a first amplifier for amplifying the electric signal, a second, field effect transistor amplifier connected to amplify the output from the first amplifier, a first impedance element connected between one terminal of the photosensitive element and the negative pole of a DC source, a second impedance element connected in parallel with the series circuit comprised by the photosensitive element and the first impedance element, and a transistor connected to the output of the second amplifier for feeding back the output to the input of the first amplifier. The device is further characterized by shutter speed display means comprising comparator means connected to the output of the second amplifier and to a reference voltage source so as to respond to a signal having the same phase as that of the input to the second amplifier and the same magnitude as a selected reference voltage, and means responsive to the output from the comparator means for displaying a predetermined shutter speed.

BRIEF DESCRIPTION OF THE DRAWING

Further objects and advantages of the invention will be more fully understood from the following detailed description taken in conjunction with the accompanying drawing in which.

DESCRIPTION OF THE PREFERRED EMBODIMENT

Figure 1:
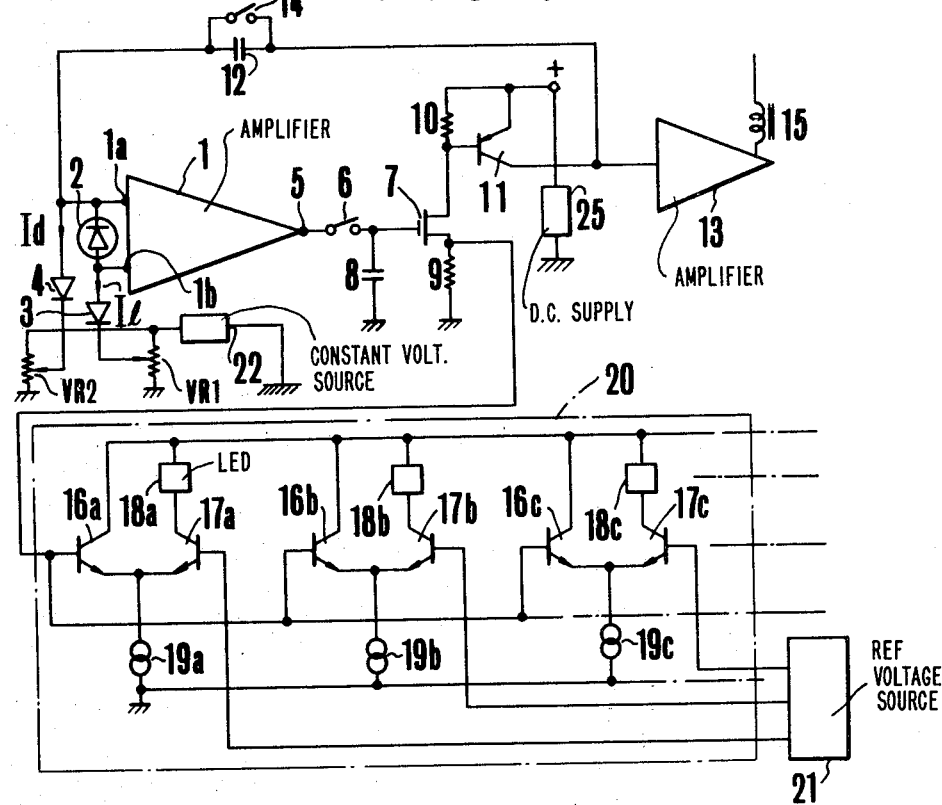
FIG. 1 shows a connection diagram of one embodiment of the shutter speed display device embodying the invention; and FI. 2 shows a connection diagram of another embodiment fo the shutter speed display device embodying the invention.

FIG. 1 shows one embodiment of a shutter speed display device incorporated into an electric shutter operating circuit applied to a single lens reflex camera. The shutter speed display device shown therein comprises an operational amplifier 1 constituted by a differential amplifier or the like, and a photosensitive element 2 which produces an electromotive force in response to incident light, such as a solar cell or the like. The photosensitive element 2 is connected across the first and second input terminals 1a and 1b of the operational amplifier 1. Diodes 3 and 4 acting as first and second impedance elements and having polarities as shown, are connected between the second and first input terminals 1b and 1a, respectively and the ground or the negative pole of a DC source 25 through the moveable contact arms of variable resistors VR1 and VR2. The variable resistors VR1 and VR2 are supplied with a constant voltage from a constant voltage source 22. The output terminal 5 of the operational amplifier 1 is connected to the gate electrode of a field effect transistor 7 through a first switch which is interlocked with the shutter release button of the camera, not shown, such that the switch 6 is opened when the shutter release button is depressed.

A memory capacitor 8 is connected between the gate electrode of the field effect transistor 7 and the ground for storing optical information of an object received by the photosensitive element 2 via amplifier 5 and switch 6. Resistors 9 and 10 are connected to the source and drain electrodes respectively of the field effect transistor 7. There is provided a transistor 11 with its base electrode connected to the drain electrode of the field effect transistor 7 and its emitter electrode connected to the positive terminal of the DC source 25. The collector electrode of transistor 11 is connected to the first input 1a of the operational amplifier 1 through a feedback path that comprises an integrating capacitor 12. The collector of transistor 11 also is connected to the input terminal terminal of a shutter trigger circuit 13. Across the capacitor 12 is connected a second switch 14 which is interlocked with the shutter release button such that the switch 14 is opened along with switch 6 when the shutter release button is depressed. Opening of switch 14 suddenly introduces integrating capacitor 12 as a load in the collector of transistor 11 and results in the production of an input trigger signal at the input of shutter trigger circuit 13. The output of the shutter trigger circuit 13 is connected to a coil 15 which operates the shutter.

The source electrode of the field effect transistor 7 is connected to the base electrodes of a plurality of transistors 16a, 16b, 16c, . . . . The number of transistors 16a, 16b, 16c, etc. corresponds to the number of shutter speeds to be displayed, and each of the transistors constitutes part of a comparator amplifer further comprising transistors 17a, 17b 17c, etc. The base electrodes of transistors 17a, 17b, 17c, . . . respectively cooperating with transistors 16a, 16b, 16c ... to form comparator amplifiers, and are connected to a source of reference voltage 21. Source 21 is designed to apply different reference voltages corresponding to the different shutter speeds to be displayed to the base electrodes of transistors 17a, 17b, 17c, ... respectively. The collector electrodes of transistors 17a, 17b, 17c ... are connected to one terminal of luminous diodes 18a, 18b, 18c, respectively, corresponding in number to the number of shutter speeds to be displayed. The emitter electrodes of transistor pairs 16a, 17a; 16b, 17b; 16c, 17c; ... are connected to constant current sources 19a, 19b, 19c ..., respectively. The circuit elements contained in a dotted line block 20 constitutes a display unit. If desired the display unit 20 may utilize a meter, for example a galvanometer or a voltage meter in place of the luminous diodes 18a, 18b, 18c, etc.

The shutter speed display device described hereinabove operates as follows:

When light from the object is received by the photosensitive element 2, a photoelectric current proportional to the brightness of the object will flow through diode 3. Further, the output of the photosensitive element 2 is amplified by the operational amplifier 1, and the amplified output thereof is negatively fed back to the first input 1a through the field effect transistor 7 and transistor 11 to normally cancel the input produced by the photosensitive element 2. For this reason, current Id proportional to the photoelectric current Il flows through the second diode 4. The output of the operational amplifier 1 is amplified by the field effect transistor 7 and then applied to the base electrode of transistor 11. The collector current Ic of transistor 11 flowing under these conditions is expressed by the following equation.

$$I_c = H_{FE} \cdot I_o (\exp \frac{q \cdot V_{BE}}{kT} - 1) \qquad (1)$$

where $H_{FE}$ represents the current amplification rate, $I_o$ the saturation current of the transistor, $k$ the Boltzmann's constant, $T$ the absolute temperature, $q$ the charge of an electron and $V_{BE}$ the voltage across the base and emitter electrodes of transistor 11.

Where transistor 11 operates in its active region since $V_{BE} \gg kT/q$, equation 1 can be rewritten as follows:

$$V_{BE} = \frac{kT}{q} \ln \frac{I_c}{I_o} \qquad (2)$$

This equation shows that the base-emitter voltage of transistor 11 is proportional to the logarithm of the collector current $I_c$. Accordingly, by connecting resistor 10 across the emitter and base electrodes of the transistor 11 to act as the load resistor for the drain electrode of the field effect transistor 7, the drain current I can be expressed by the following equation $$I = \frac{V_{BE}}{R} \qquad (3)$$

where R represents the resistance value of resistor 10.

Since the drain current and the source current of the field effect transistor are equal, the source voltage $V_s$ caused by the flow of the drain current I shown by equation 3 is expressed by the following equation:

$$V_s = nR \cdot I = n V_{BE} \qquad (4)$$

where R represents the resistance value of the source resistor and n a constant connected to the source electrode of the second, field effect transistor amplifier.

Accordingly, by selecting a suitable value for the constant $n$ from equation 4 the source voltage of the field effect transistor 7 can be expressed as the logarithm of the collector current of transistor 11, or the feedback current, which is equivalent to the multiple of the voltage across diode 4, and is proportional to the brightness of the light falling on light sensitive element 2. For this reason, where the source voltage of the field effect transistor 7 is impressed upon the transistors 16a, 16b, 16c ..., and where the reference voltages of the source 21 are applied to the base electrodes of transistors 17a, 17b, 17c ..., dependent upon the value of the source voltage, one of the luminous diodes 18a, 18b, 18c ... is caused to luminesce, thus displaying one of the shutter speeds. It is to be understood that the invention is also applicable to range shutter cameras or conventional indicating meters.

Figure 2:
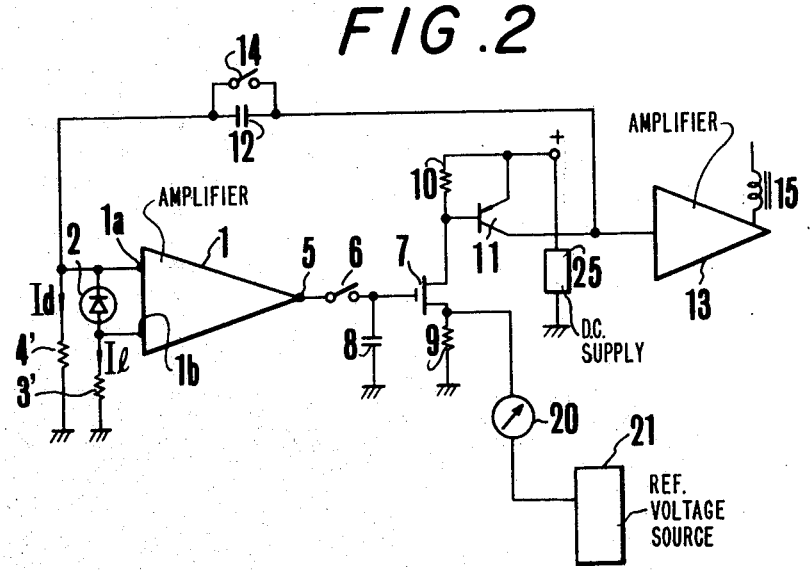

As shown in FIG. 2, in a modification of the electric shutter operating circuit, there are provided resistors 3' and 4' instead of the diodes 3 and 4. In this case, variable resistors VR1 and VR2, and constant voltage source 22 can be omitted. When combined with the display unit 20, such as a meter, this modified electric shutter operating circuit can be operated in the substantially same manner as described in FIG. 1.

As has been described above, according to the novel shutter speed display device embodying this invention and incorporated into an electric shutter operating circuit it is possible to correctly display the shutter speeds because the shutter speeds are displayed by using a signal proportional to the brightness of the object. It is also possible to obtain information regarding the sensitivity of the photographic film, (ASA) and the size of the opening of the iris diaphragm from the setting of the visible resistors VR2 and VR1, respectively. Further, in accordance with this invention, it is possible to independently display the shutter speeds without causing the input signal to the shutter speed display circuit to adversely affect the operation of the shutter circuit. Further, the shutter speed display signal has already been amplified in the shutter operating circuit and it is not necessary to amplify the input to the shutter speed display circuit separately thus simplifying the construction thereof.

While the invention has been shown and described in terms of a preferred embodiment thereof it will be clear that many changes and modifications will be obvious to one skilled in the art without departing from the spirit and scope of the invention as defined in the appended claims.

What is claimed is:

1. In a shutter speed control and display device including in combination an electric shutter operating circuit for a photographic camera comprising a photosensitive element for producing an electric signal corresponding to the brightness of an object, a first differential amplifier for amplifying said electric signal having the photoelement connected across the input terminals thereof, a second amplifier connected to amplify the output from said first amplifier, a first impedance element connected between one terminal of said photosensitive element and one pole of a DC source of voltage, a second impedance element connected in parallel circuit relationship with the series circuit comprised by said photosensitive element and said first impedance element, and a transistor having its base connected to the output of said second amplifier and its collector connected back to one input of the first amplifier for feeding back the output signal from said second amplifier to the input of said first amplifier for nulling the voltage across the input terminals of said first differential amplifier due to said photosensitive element, wherein said second amplifier comprises a field effect transistor amplifier having respective source and drain resistors, and having the gate electrode thereof connected to the output from said first amplifier, said drain resistor being connected across the base-emitter of said feedback transistor, and shutter speed display means connected across said source resistor.

2. The shutter speed control and display device according to claim 1 wherein said shutter speed display means comprises comparator means having a first set of inputs connected across said source resistor and having a second set of inputs connected to a source of reference voltage whereby the input to the comparator has the same phase as the input to the second amplifier, and the comparator selectively responds to input signals of varying magnitude representative of different predetermined shutter speeds, and means responsive to the comparator means for displaying a predetermined shutter speed.

3. The shutter speed control and display device according to claim 2 wherein said comparator means comprises a plurality of parallel connected differential amplifiers and a plurality of luminous display means energized by the respective differential amplifiers for displaying a plurality of shutter speeds, each one of said differential amplifiers comprising a pair of transistors, means for connecting the base electrode of one transistor of each said pair across the source resistor of said field effect transistor, means for connecting the base electrode of the other transistor of each said pair to said reference voltage source, and means for connecting the emitter electrodes of said pair of transistors to a source of constant current.

4. The shutter speed control and display device according to claim 1 wherein said first and second impedance elements comprise diodes connected in series circuit relationship with variable resistor elements, the setting of the variable resistor element comprising the first impedance element provides an indication of the size of the opening of the iris diaphragm, and the setting of the variable resistor element comprising the second impedance element provides an indication of the sensitivity of the photographic film.

5. The shutter speed control and display device according to claim 1 wherein said first and second impedance elements comprise resistors.

6. The shutter speed control and display device according to claim 1 wherein said shutter speed display means comprises a meter.

7. The shutter speed control and display device according to claim 1, further including a shutter release on-off switch and storage capacitor connected in series circuit relationship across the output from the first differential amplifier, the gate electrode of the second field effect transistor is connected to the storage capacitor, an integrating capacitor and parallel connected by-pass shutter release on-off switch connected in the feedback path between the collector of the transistor and the input to the first amplifier, and a shutter trigger circuit connected to the collector of the transistor.

8. The shutter speed control and display device according to claim 7 wherein said shutter speed display means comprises comparator means having a first set of inputs connected across said source resistor and having a second set of inputs connected to a source of reference voltage whereby the input to the comparator has the same phase as the input to the second amplifier, and the comparator selectively responds to input signals of varying magnitude representative of different predetermined shutter speeds, and means responsive to the comparator means for displaying a predetermined shutter speed.

9. The shutter speed control and display device according to claim 8, wherein said comparator means comprises a plurality of parallel connected differential amplifiers and a plurality of luminous display means energized by the respective differential amplifiers for displaying a plurality of shutter speeds, each one of said differential amplifiers comprising a pair of transistors, means for connecting the base electrode of one transistor of each said pair across the source resistor of said field effect transistor, means for connecting the base electrode of the other transistor of each said pair to said reference voltage source, and means for connecting the emitter electrodes of said pair of transistors to a source of constant current.

10. The shutter speed control and display device according to claim 9, wherein said first and second impedance elements comprise diodes connected in series circuit relationship with variable resistor elements, the setting of the variable resistor element comprising the first impedance element provides an indication of the size of the opening of the iris diaphragm, and the setting of the variable resistor element comprising the second impedance element provides an indication of the sensitivity of the photographic film.

* * * * *